(12) United States Patent
Hsu

(10) Patent No.: US 7,684,584 B2
(45) Date of Patent: Mar. 23, 2010

(54) ELECTRICALLY ANGLE-ADJUSTABLE SPEAKER

(75) Inventor: Wen-Chuan Hsu, Chung-Ho (TW)

(73) Assignee: Jazz Hipster Corp., Taipei (TW)

(*) Notice: Subject to any disclaimer, the term of this patent is extended or adjusted under 35 U.S.C. 154(b) by 999 days.

(21) Appl. No.: 11/413,096

(22) Filed: Apr. 28, 2006

(65) Prior Publication Data

US 2007/0253304 A1    Nov. 1, 2007

(51) Int. Cl.
*H04R 25/00* (2006.01)
(52) U.S. Cl. .................. 381/387; 381/87; 381/386
(58) Field of Classification Search .............. 381/86, 381/87, 332, 334, 336, 152, 182, 186, 386, 381/387, 388, 395; 181/141, 150, 199; 248/320, 248/343; 362/364
See application file for complete search history.

(56) References Cited

U.S. PATENT DOCUMENTS 4,811,406 A * 3/1989 Kawachi ............... 381/186
5,321,760 A * 6/1994 Gray ..................... 381/86
6,343,135 B1 * 1/2002 Ellero et al. ............ 381/387
7,266,210 B2 * 9/2007 Lam et al. .............. 381/368

* cited by examiner

*Primary Examiner*—Huyen D Le
(74) *Attorney, Agent, or Firm*—Chun-Ming Shih

(57) ABSTRACT

An electrically angle-adjustable speaker includes a seat unit, a rotation unit and a speaker unit. A hole is provided at the central portion of the seat unit and a horizontal-rotation driving mechanism is provided by the hole. An arcuate toothed track is provided on the rotation unit, and a limiting track is provided below the track. A hole is provided at the central portion of the rotation unit. A vertical-rotation driving mechanism and a first limiting device are provided in the front portion of the hole. Two pivot bearings are provided in the rear portion of the hole. A toothed track and a positioning track are provided on the arcuate upper surface of the speaker unit. After the aforesaid components are put together, the electrically angle-adjustable speaker of the present invention is formed.

6 Claims, 5 Drawing Sheets

ELECTRICALLY ANGLE-ADJUSTABLE SPEAKER

BACKGROUND OF THE INVENTION

1. Field of Invention

The invention generally relates to an electrically angle-adjustable speaker. More particularly, the invention relates to an electrically angle-adjustable speaker that may be fitted on a ceiling or be hidden in a ceiling and may be electrically rotated horizontally and vertically so that the speaker unit may point at various directions.

2. Description of Related Art

As of now, many people have hi-fi speakers, home theater speakers, karaoke speakers, etc. in their homes. Some companies have speakers fitted on the ceiling of their conference room. With the speakers, a higher level of audio enjoyment may be achieved or people may have a better understanding of the contents of a meeting.

However, the speakers of the prior art are usually fitted on a ceiling and the angles that they are pointing may not be electrically adjusted. If the angle of a speaker is to be adjusted, we have to adjust it manually; if a speaker is fixedly fitted, its angle may not be adjusted.

From the above, we can see that the speakers of the prior art have many disadvantages and need to be improved.

To eliminate the disadvantages of the speakers of the prior art, the inventor has put in a lot of effort in the subject and has successfully come up with the electrically angle-adjustable speaker of the present invention.

SUMMARY OF THE INVENTION

The present invention is to provide an electrically angle-adjustable speaker that may be fitted on a ceiling or be hidden in a ceiling and may be rotated horizontally and vertically so that the speaker unit may point at various directions.

Another, the present invention is to provide an electrically angle-adjustable speaker that may be electrically rotated horizontally and vertically so that a user does not have to adjust it manually.

Third, the present invention is to provide an electrically angle-adjustable speaker that the speaker unit may automatically return to its original position and/or be hidden in the ceiling when the audio signal stops or when the speaker unit is turned off.

Fourth, the present invention is to provide an electrically angle-adjustable speaker that is structurally simple and easy to use.

The electrically angle-adjustable speaker of the present invention comprises a seat unit, a rotation unit and a speaker unit. A hole is provided at the central portion of the seat unit. A horizontal-rotation driving mechanism is provided by the hole and has a transmission gear. The rotation unit is fitted in the hole. An arcuate toothed track is provided on the rotation unit and may be engaged with the transmission gear of the horizontal-rotation driving mechanism. A limiting member is provided on each end of the track. A limiting track is provided below the toothed track, and a plurality of positioning members are provided along the limiting track. A hole is provided at the central portion of the rotation unit. A vertical-rotation driving mechanism and a first limiting device are provided in the front portion of the hole. The vertical-rotation driving mechanism has a transmission gear and may be engaged with the toothed track of the speaker unit. A second limiting device is disposed in the hole. Either of the two limiting devices has a sliding piece, and a micro switch is provided on each sliding piece. Two pivot bearings are provided in the rear portion of the hole. One or more rollers are circumferentially provided in the lower portion of the rotation unit and may assist the horizontal rotation of the rotation unit. The speaker unit may be fitted onto the rotation unit through two pivot bearings. A toothed track and a positioning track are provided on the arcuate upper surface of the speaker unit. Several positioning members are provided along the positioning track. After the aforesaid components are put together, the electrically angle-adjustable speaker of the present invention is formed.

These features and advantages of the present invention will be fully understood and appreciated from the following detailed description of the accompanying drawings.

DETAILED DESCRIPTION OF THE PREFERRED EMBODIMENT

Figure 1:
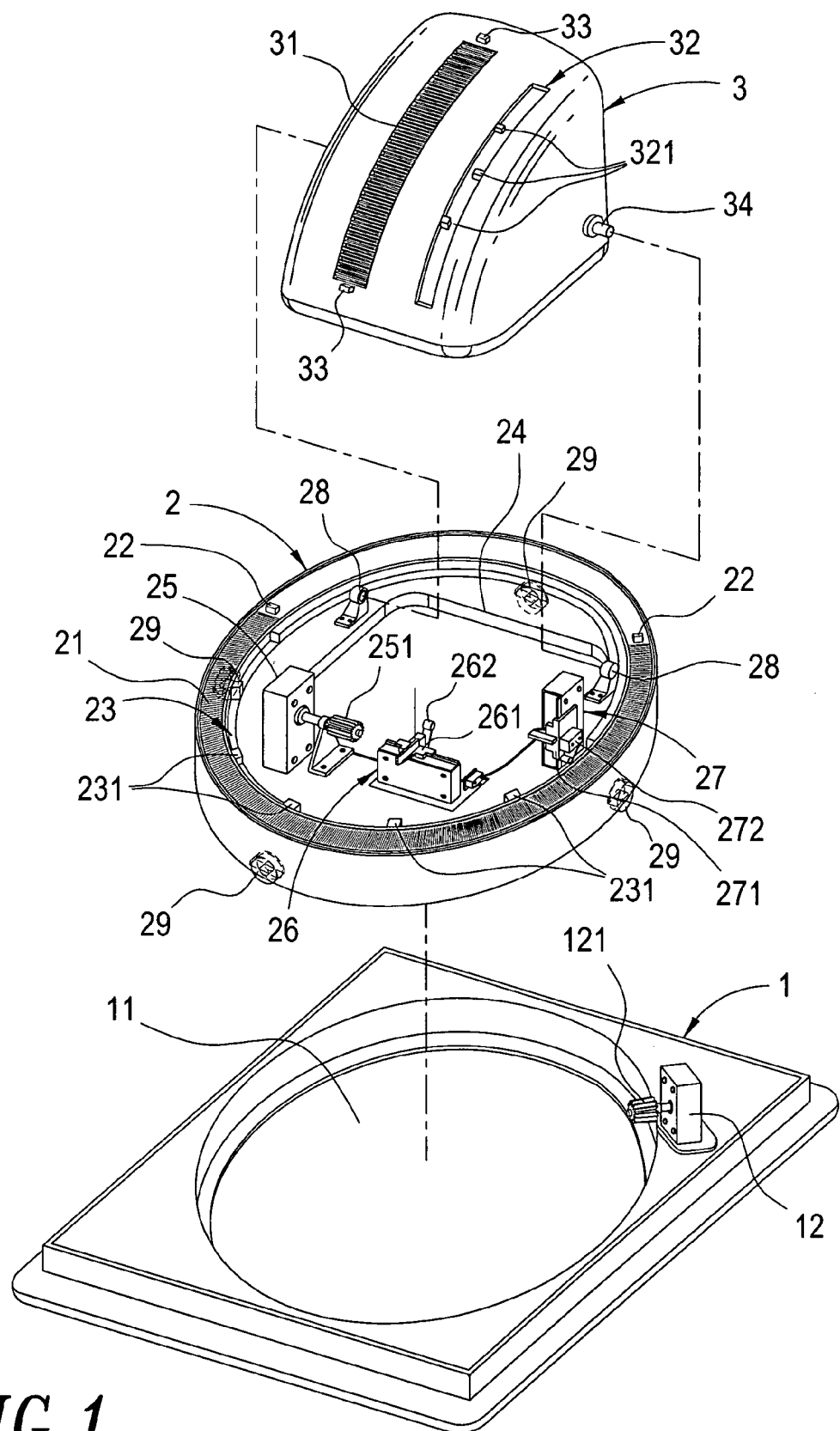
FIG. 1 is an exploded view of the electrically angle-adjustable speaker of the present invention.
Figure 2:
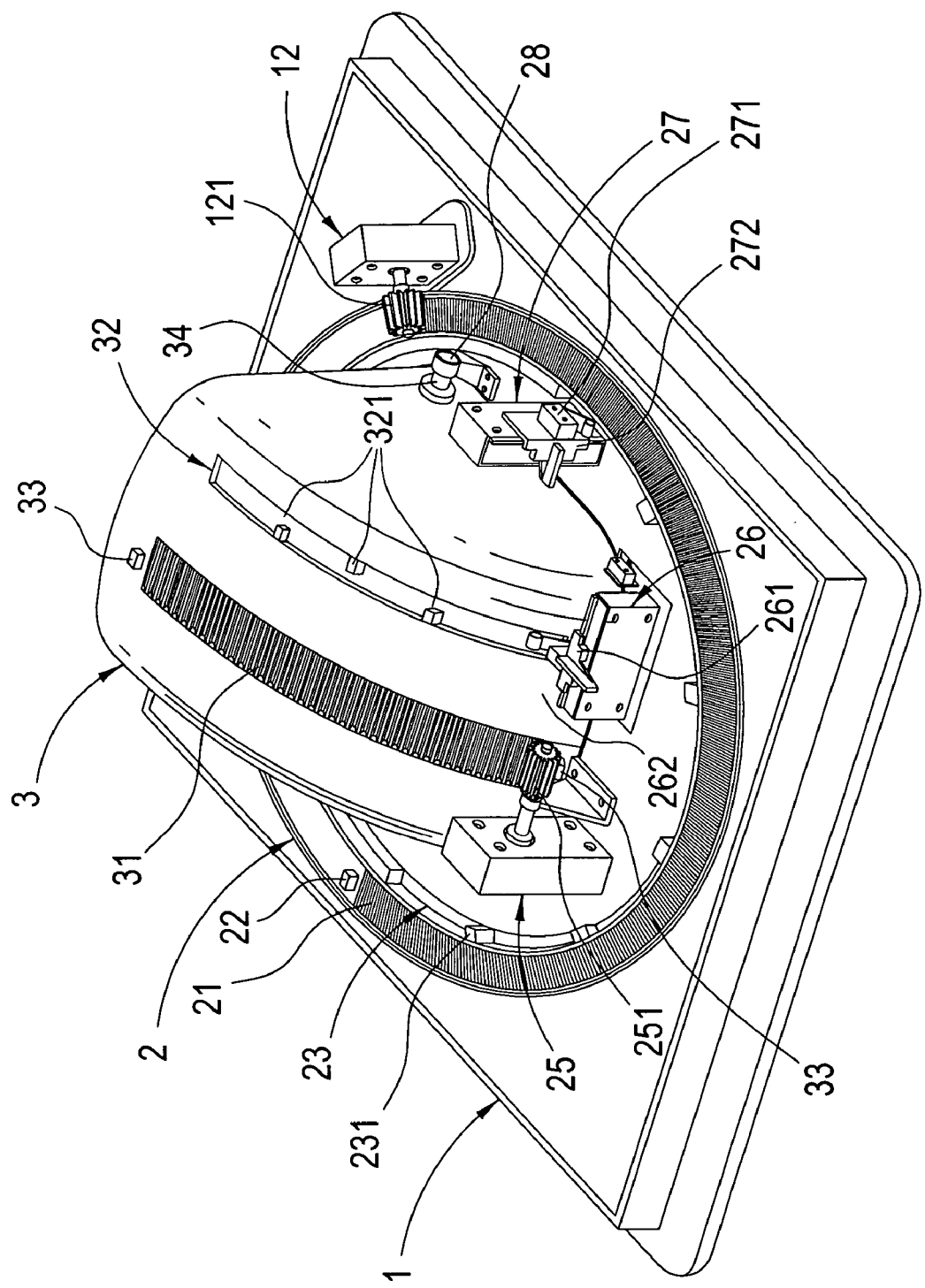
FIG. 2 is a perspective view showing the electrically angle-adjustable speaker of the present invention in its assembled condition.

As illustrated in FIGS. 1 and 2, the electrically angle-adjustable speaker of the present invention comprises a seat unit 1, a rotation unit 2 and a speaker unit 3.

A hole 11 is provided at the central portion of the seat unit 1. A horizontal-rotation driving mechanism 12 is provided by the hole 11 and has a transmission gear 121.

An arcuate toothed track 21 is provided on the rotation unit 2, and a limiting member 22 is provided on each end of the track 21. A limiting track 23 is provided below the track 21, and a plurality of positioning members 231 are provided along the limiting track 23. A hole 24 is provided at the central portion of the rotation unit 2. A vertical-rotation driving mechanism 25 and a first limiting device 26 are provided in the front portion of the hole 24. The vertical-rotation driving mechanism 25 has a transmission gear 251. A second limiting device 27 is disposed in the hole 24. Either of the two limiting devices 26 and 27 has a sliding piece 261 and 271, and a micro switch 262 and 272 is provided on each sliding piece 261 and 271. Two pivot bearings 28 are provided in the rear portion of the hole 24. One or more rollers 29 are circumferentially provided in the lower portion of the rotation unit 2. The rotation unit 2 is fitted into the hole 11 of the seat unit 1. The toothed track 21 may be engaged with the transmission gear 121 of the horizontal-rotation driving mechanism 12. When the transmission gear 121 reaches either limiting member 22, the latter can stop the horizontal rotation of the rotation unit 2. In operation, with regard to the first limiting device 26, the micro switch 262 and the sliding piece 261 allow the vertical rotation of the speaker unit 3, and the micro switch 262 of the first limiting device 26 may be positioned at one of the positioning members 321 of the positioning track 32 so as to control the angle of the vertical rotation of the speaker unit 3. Similarly, in operation, with regard to the second limiting device 27, the micro switch 272 and the sliding piece 271 allow the horizontal rotation of the speaker unit 3, and the micro switch 272 of the second limiting device 27 may be positioned at one of the positioning members 231 of the limiting track 23 so as to control the angle of the horizontal rotation of the speaker unit 3. The rollers 29 may assist the horizontal rotation of the rotation unit 2.

The speaker unit 3 has an arcuate upper surface. A toothed track 31 and a positioning track 32 are provided on the arcuate upper surface of the speaker unit 3. Several positioning members 321 are provided along the positioning track 32. A limiting member 33 is provided on each end of the toothed track 31. A pivot 34 is provided on each side of the speaker unit 3. The two pivots 34 may be fitted onto the two pivot bearings 28 so as to allow the speaker unit 3 to rotate vertically in the hole 24 of the rotation unit 2. The toothed track 31 may be engaged with the transmission gear 251 of the vertical-rotation driving mechanism 25. When the transmission gear 251 reaches either limiting member 33, the latter can stop the vertical rotation of the speaker unit 3.

Figure 3A:
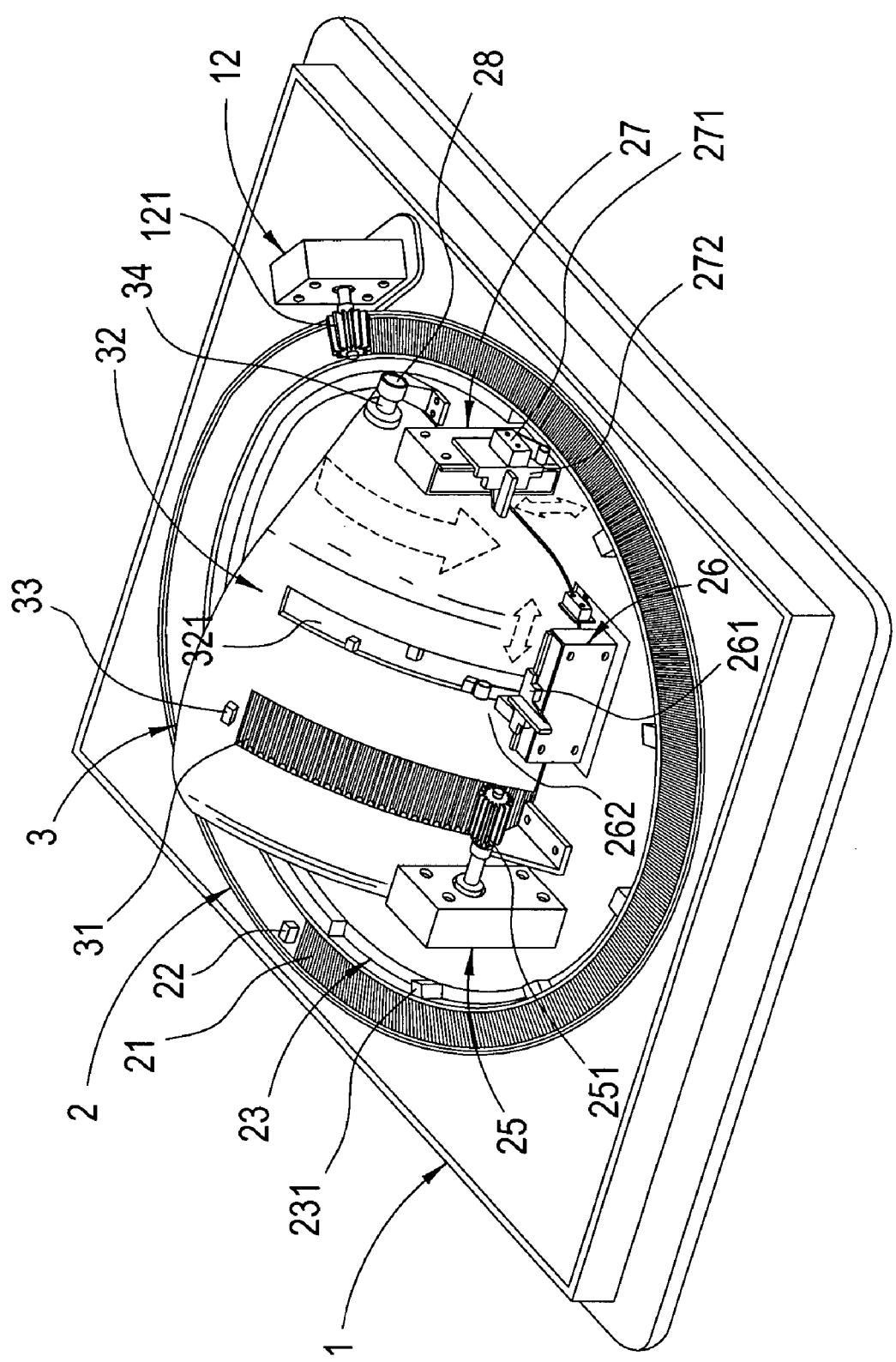
FIGS. 3A, 3B and 3C are three perspective views showing the electrically angle-adjustable speaker of the present invention in operation.
Figure 3:
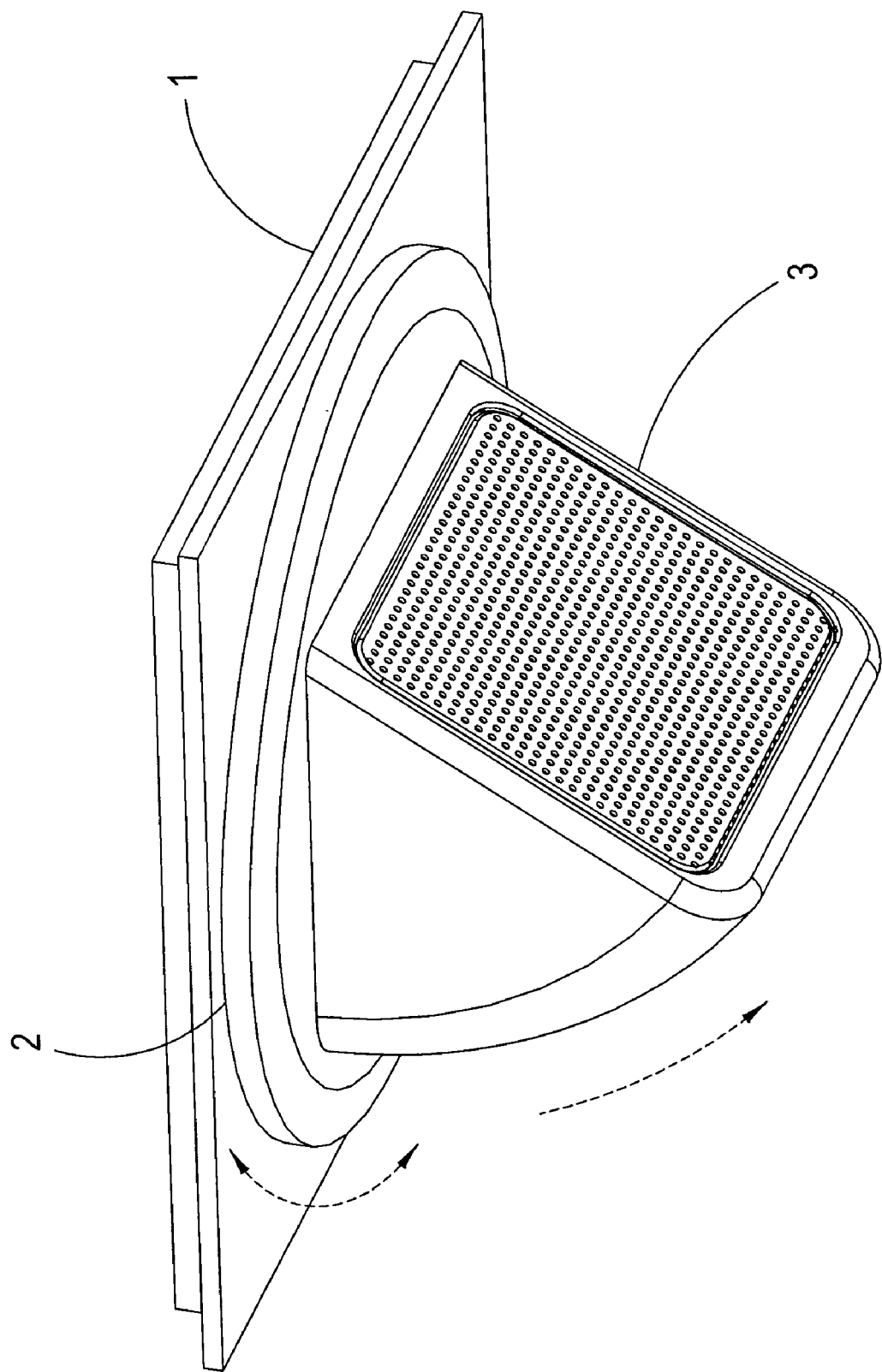
Figure 3:
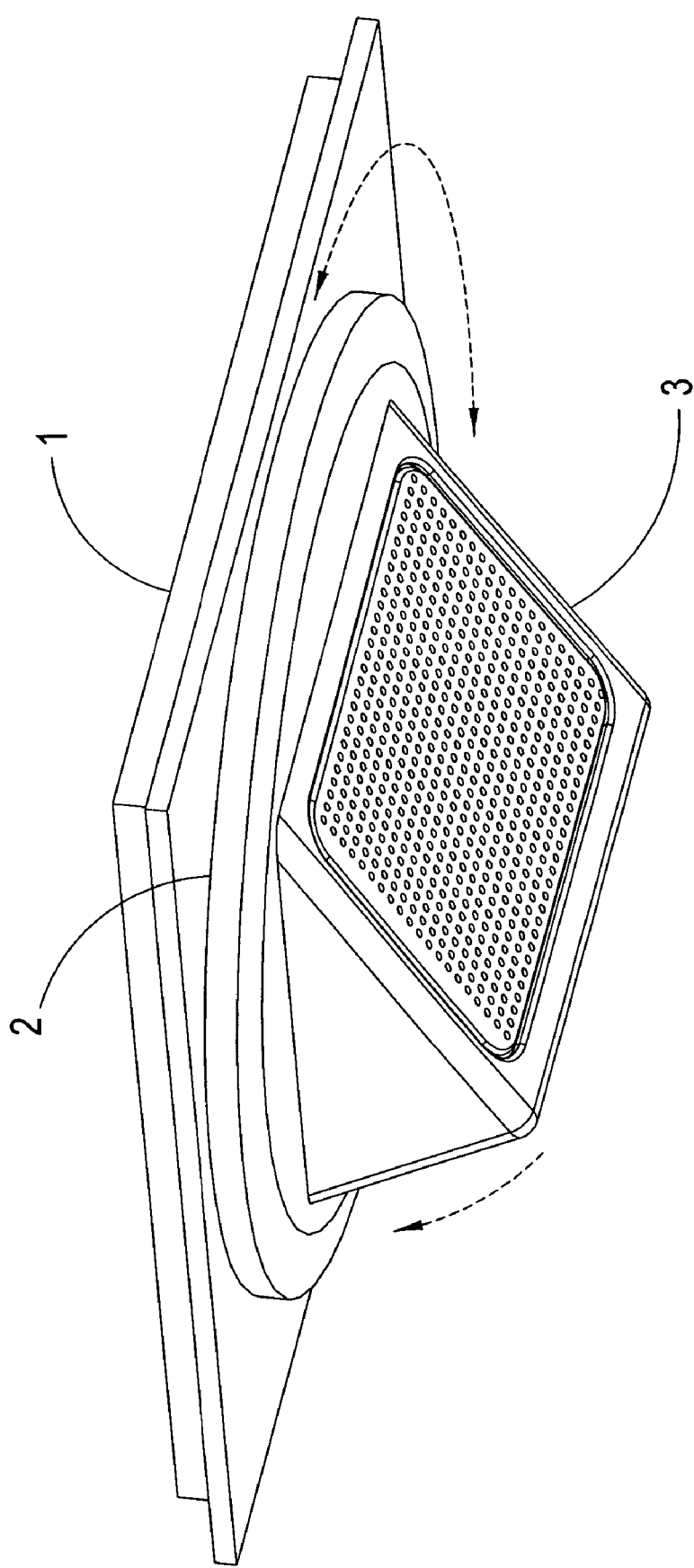

After the aforementioned components are put together, the electrically angle-adjustable speaker of the present invention is formed. As illustrated in FIGS. 3A, 3B and 3C, the driving forces provided by the horizontal transmission mechanism 12 and the vertical-rotation driving mechanism 25, the limiting track 23 and the positioning track 32 allow the vertical rotation of the speaker unit 3. Also, the speaker unit 3 may rotate horizontally. Hence, the speaker unit 3 may be adjusted to point at various directions. In addition, when the audio signal stops or when the speaker unit is turned off, the speaker unit 3 may automatically return to its original position and be hidden in the ceiling. In addition, the electrically angle-adjustable speaker of the present invention has a unique appearance.

In contrast to the prior art speaker, the electrically angle-adjustable speaker of the present invention has the following three advantages:

1. The electrically angle-adjustable speaker of the present invention of the present invention may be fitted on a ceiling hidden in a ceiling and may be rotated horizontally and vertically so that the speaker unit may point at various directions.

2. The electrically angle-adjustable speaker of the present invention of the present invention may be electrically rotated horizontally and vertically so that a user does not have to adjust it manually.

3. When the audio signal stops or when the speaker unit is turned off, the speaker unit may automatically return to its original position or be hidden in the ceiling.

4. The electrically angle-adjustable speaker of the present invention of the present invention is structurally simple and easy to use.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An electrically angle-adjustable speaker, comprising:
a seat unit with a hole provided at a central portion thereof and including a horizontal-rotation driving mechanism provided in the hole and having a transmission gear;
a rotation unit including an arcuate toothed track provided thereon, a first limiting member provided on each end of the arcuate toothed track, a limiting track provided below the arcuate toothed track, and a plurality of positioning members provided along the limiting track, a hole being provided at a central portion of the rotation unit, a vertical-rotation driving mechanism and a first limiting device being provided in a front portion of the hole, the vertical-rotation driving mechanism having a transmission gear, a second limiting device being disposed in the hole, either of the first and the second limiting devices having a sliding piece, a micro switch being provided on each sliding piece, two pivot bearings being provided in a rear portion of the hole, one or more rollers being circumferentially provided in a lower portion of the rotation unit, the rotation unit being fitted into the hole of the seat unit; and
a speaker unit including a toothed track and a positioning track provided on an upper surface thereof, a plurality of positioning members provided along the positioning track, a second limiting member provided on each end of the toothed track, a pivot provided on each side of the speaker unit to be fitted onto the pivot bearing.

2. The electrically angle-adjustable speaker as in claim 1, wherein the arcuate toothed track of the rotation unit is engaged with the transmission gear of the horizontal-rotation driving mechanism and when the transmission gear reaches the first limiting member the horizontal rotation of the rotation unit is stopped thereby.

3. The electrically angle-adjustable speaker as in claim 1, wherein, in operation, with regard to the first limiting device, the micro switch and the sliding piece allow the vertical rotation of the speaker unit and the micro switch of the first limiting device is positioned at one of the positioning members of the positioning track so as to control an angle of the vertical rotation of the speaker unit.

4. The electrically angle-adjustable speaker as in claim 1, wherein, in operation, with regard to the second limiting device, the micro switch and the sliding piece allow the horizontal rotation of the rotation unit, and the micro switch of the second limiting device is positioned at one of the positioning members of the positioning track so as to control an angle of the horizontal rotation of the rotation unit.

5. The electrically angle-adjustable speaker as in claim 1, wherein the rollers assist the horizontal rotation of the rotation unit.

6. The electrically angle-adjustable speaker as in claim 1, wherein the toothed track of the speaker unit is engaged with the transmission gear of the vertical-rotation driving mechanism and when the transmission gear reaches the second limiting member the vertical rotation of the speaker unit is stopped thereby.

* * * * *